(12) United States Patent
Jeong et al.

(10) Patent No.: US 12,531,865 B2
(45) Date of Patent: Jan. 20, 2026

(54) ACCESS CONTROL SYSTEM, ACCESS CONTROL METHOD, AND ACCESS CONTROL PROGRAM

(71) Applicant: HITACHI, LTD., Tokyo (JP)

(72) Inventors: Misu Jeong, Tokyo (JP); Shinichi Nakamura, Tokyo (JP); Shingo Masuyama, Tokyo (JP); Atsumi Mano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 202 days.

(21) Appl. No.: 18/026,618

(22) PCT Filed: Sep. 22, 2021

(86) PCT No.: PCT/JP2021/034872
§ 371 (c)(1),
(2) Date: Mar. 16, 2023

(87) PCT Pub. No.: WO2022/163010
PCT Pub. Date: Aug. 4, 2022

(65) Prior Publication Data
US 2023/0336555 A1      Oct. 19, 2023

(30) Foreign Application Priority Data
Jan. 28, 2021   (JP) .................................. 2021-012503

(51) Int. Cl.
*H04L 9/40* (2022.01)
(52) U.S. Cl.
CPC .......... *H04L 63/101* (2013.01); *H04L 63/102* (2013.01)

(58) Field of Classification Search
CPC ........................... H04L 63/101; H04L 63/102
See application file for complete search history.

(56) References Cited

U.S. PATENT DOCUMENTS

| | | | |
|---|---|---|---|
| 9,286,187 B2 * | 3/2016 | Brucker | ................ G06F 21/563 |
| 2006/0167737 A1 * | 7/2006 | Muller | .................. G06Q 10/10 |
| | | | 705/7.16 |

(Continued)

FOREIGN PATENT DOCUMENTS

| JP | 2009301357 A | 12/2009 |
|---|---|---|
| WO | 2014013551 A1 | 1/2014 |

OTHER PUBLICATIONS

Japanese Office Action received in corresponding Japanese Application No. 2021-012503 dated Nov. 21, 2023.

(Continued)

*Primary Examiner* — Harris C Wang
(74) *Attorney, Agent, or Firm* — MATTINGLY & MALUR, PC (57) ABSTRACT

The invention includes: a model management unit configured to manage a chain of supply-related task as a model; a role management unit configured to assign a role to an executor of each of the tasks to manage the roles; a task access authority setting unit configured to set a task-specific access authority for each of the roles to generate task access authority information; and an access control unit configured to, when access from the executor of each of the tasks is received, refer to the task access authority information based on the role assigned to the executor and perform access control. With such configurations, detailed access control can be performed for a chain of supply-related tasks.

8 Claims, 10 Drawing Sheets

(56) References Cited

U.S. PATENT DOCUMENTS

| | | | | |
|---|---|---|---|---|
| 2011/0107231 A1* | 5/2011 | Gueldemeister | ....... | G06Q 10/10 715/745 |
| 2014/0157370 A1* | 6/2014 | Plattner | ................... | H04L 63/06 726/4 |
| 2014/0236885 A1* | 8/2014 | Muller | ................... | G06Q 10/10 707/608 |
| 2015/0193706 A1* | 7/2015 | Iwasaki | ................ | G06F 9/4881 705/7.27 |
| 2020/0177386 A1* | 6/2020 | Mahmood | ............. | H04L 63/102 |
| 2020/0389543 A1* | 12/2020 | Swope | .................... | H04L 67/34 |
| 2023/0297671 A1* | 9/2023 | El-Moussa | ............ | G06F 21/565 726/23 |

OTHER PUBLICATIONS

International Search Report of PCT/JP2021/034872 dated Dec. 21, 2021.

* cited by examiner

USER DATA

| USER ID | NAME | ... |
|---|---|---|
| usr001 | abc | ... |
| : | | |

ROLE SETTING DATA

| USER ID | ROLE ID |
|---|---|
| usr001 | role10 |
| : | |

FUNCTION ACCESS AUTHORITY DATA

| FUNCTION ID | ROLE ID | AUTHORITY |
|---|---|---|
| fnc001 | role10 | R |
| fnc001 | role11 | RW |
| : | | |

TASK ACCESS AUTHORITY DATA

| TASK ID | ROLE ID | AUTHORITY |
|---|---|---|
| act001 | role10 | R |
| act001 | role11 | RW |
| : | | |

| ROLE DEFINITION | | |
|---|---|---|
| ROLE ID | ROLE NAME | ... |
| : | | |
| role10 | DOCTOR | ... |
| role11 | MEDICAL PROFESSIONAL | ... |
| : | | |
| role21 | PERSON IN CHARGE OF TRANSPORTATION | ... |
| : | | |
| role32 | PHARMACEUTICAL TECHNICIAN | ... |
| : | | |

[FIG. 6]

TASK ACCESS AUTHORITY SETTING

| role10 | DOCTOR |

| TASK ID | TASK NAME | AUTHORITY |
|---|---|---|
| act001 | CASE NUMBER ISSUE | REFERENCE-ONLY (R) |
| act002 | SAMPLE COLLECTION | REFERENCE AND REGISTRATION (RW) |
| act003 | ORDER RECEPTION CONFIRMATION | NONE (D) |
| ⋮ | | |

TASK ACCESS AUTHORITY SETTING

| role32 | PHARMACEUTICAL TECHNICIAN |
|---|---|

| TASK ID | TASK NAME | AUTHORITY |
|---|---|---|
| act001 | CASE NUMBER ISSUE | REFERENCE-ONLY (R) |
| act002 | SAMPLE COLLECTION | NONE (D) |
| act003 | ORDER RECEPTION CONFIRMATION | NONE (D) |
| : | | |

ACCESS CONTROL SYSTEM, ACCESS CONTROL METHOD, AND ACCESS CONTROL PROGRAM

TECHNICAL FIELD

The present invention relates to an access control system, an access control method, and an access control program.

BACKGROUND ART

In the related art, a technique for controlling access from a user is described in JP2009-301357A (PTL 1). This publication discloses that "a computer is caused to execute, when an application accesses a resource, a role identification procedure of identifying, from an operating environment in which the application is executed, a role stored in an operating environment storage unit that stores roles of users in association with the operating environment in which the application is executed. In addition, a computer device disclosed in the present application causes a computer to execute an access control execution procedure of identifying, from an access control information storage unit that stores access control information in association with the role of the user, access control information associated with the role identified by the role identification procedure, and executing access control to the resource based on the identified access control information".

CITATION LIST

Patent Literature

PTL 1: JP2009-301357A

SUMMARY OF INVENTION

Technical Problem

PTL 1 can handle a situation where authorities granted to the same user are inconsistent due to access control by an operating system (OS) and access control by an application, but cannot handle advanced access control in a system in which a plurality of users are involved in a complex manner.

For example, in a supply chain, which is a chain of supply-related tasks, roles are assigned to users involved and access control per unit of function is performed for each of the roles, but if the roles are the same and functions are the same, the same access authority will be given to any task.

Accordingly, an object of the invention is to provide an access control system, an access control method, and an access control program capable of performing detailed access control.

Solution to Problem

In order to achieve the above object, representative one of an access control system, an access control method, and an access control program according to the invention manages a chain of supply-related tasks as a model, assigns a role to an executor of each of the tasks to manage the role, sets a task-specific access authority for the role to generate task access authority information, and, when access from the executor of the task is received, refers to the task access authority information based on the role assigned to the executor to perform access control.

Advantageous Effects of Invention

According to the invention, detailed access control can be performed. Problems, configurations, and effects other than those described above will be clarified by the following description of an embodiment.

DESCRIPTION OF EMBODIMENTS

Hereinafter, embodiments will be described using the drawings.

EMBODIMENTS

Figure 1:
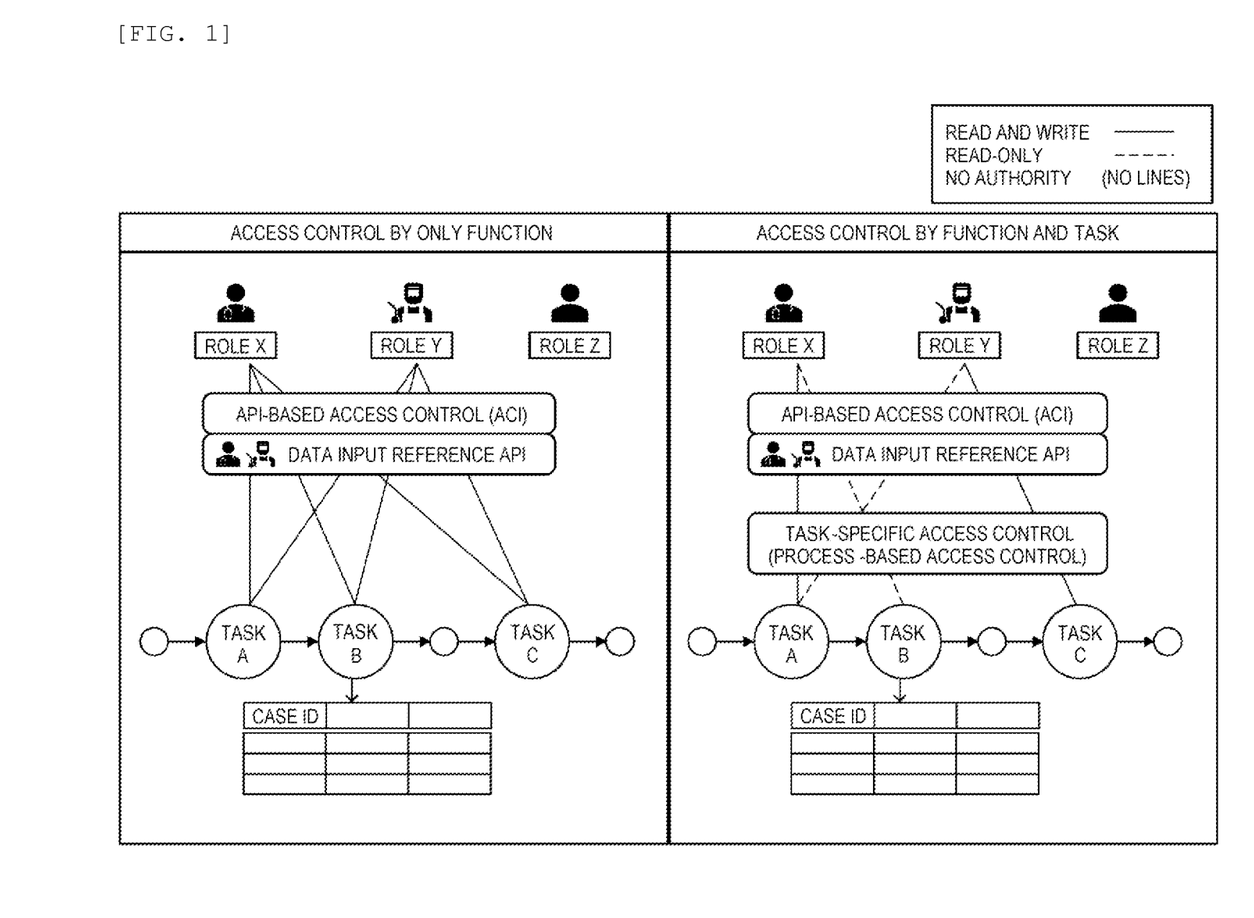
FIG. 1 is an explanatory diagram of access control according to an embodiment.

FIG. 1 is an explanatory diagram of access control according to the embodiment. In the present embodiment, access control in a system that manages a supply chain, which is a chain of supply-related tasks, in particular a supply chain of regenerative medicine products and the like will be described as an example.

In the supply chain illustrated in FIG. 1, a task C is executed for an article obtained by sequentially executing a task A and a task B. Examples of the tasks include, for example, a task of collecting a sample from a patient, a task of transporting the sample, a task of producing a drug using the sample, a task of transporting the drug, and a task of administering the drug. In addition, the article is the sample or the drug at that time. In this system, the supply chain is managed by a model in which the tasks and articles are set as nodes and the nodes are connected by links. Then, by associating an execution history and the like with each node, progress status for each case is managed.

The system assigns a role to an executor of each of the tasks to manage the roles. The roles are, for example, a doctor, a medical professional, a person in charge of transportation, a pharmaceutical technician, and the like. For example, if an API is prepared for each function in the system, by setting role access authorities in each API, function-specific access control can be implemented on the role. For the sake of convenience, such access control per unit of API is called API-based access control (ACL).

In FIG. 1, a read and write authority for a data input reference API is granted to a role X and a role Y. That is, the role X and the role Y are permitted to input (write) data and refer to (read) data in a function of data input reference.

However, with only the API-based access control, the same access authority is given to any task. Therefore, the system according to the present embodiment further sets a task-specific access authority for each of the roles, and performs function-based and task-based access control. For the sake of convenience, the task-based access control is called process-based access control.

With such process-based access control, detailed access control can be implemented in such a manner that the role X is permitted for the read and write of the task A and the read of the task B and the role Y is permitted for the read of the task A and the read and write of the task C.

Figure 2:
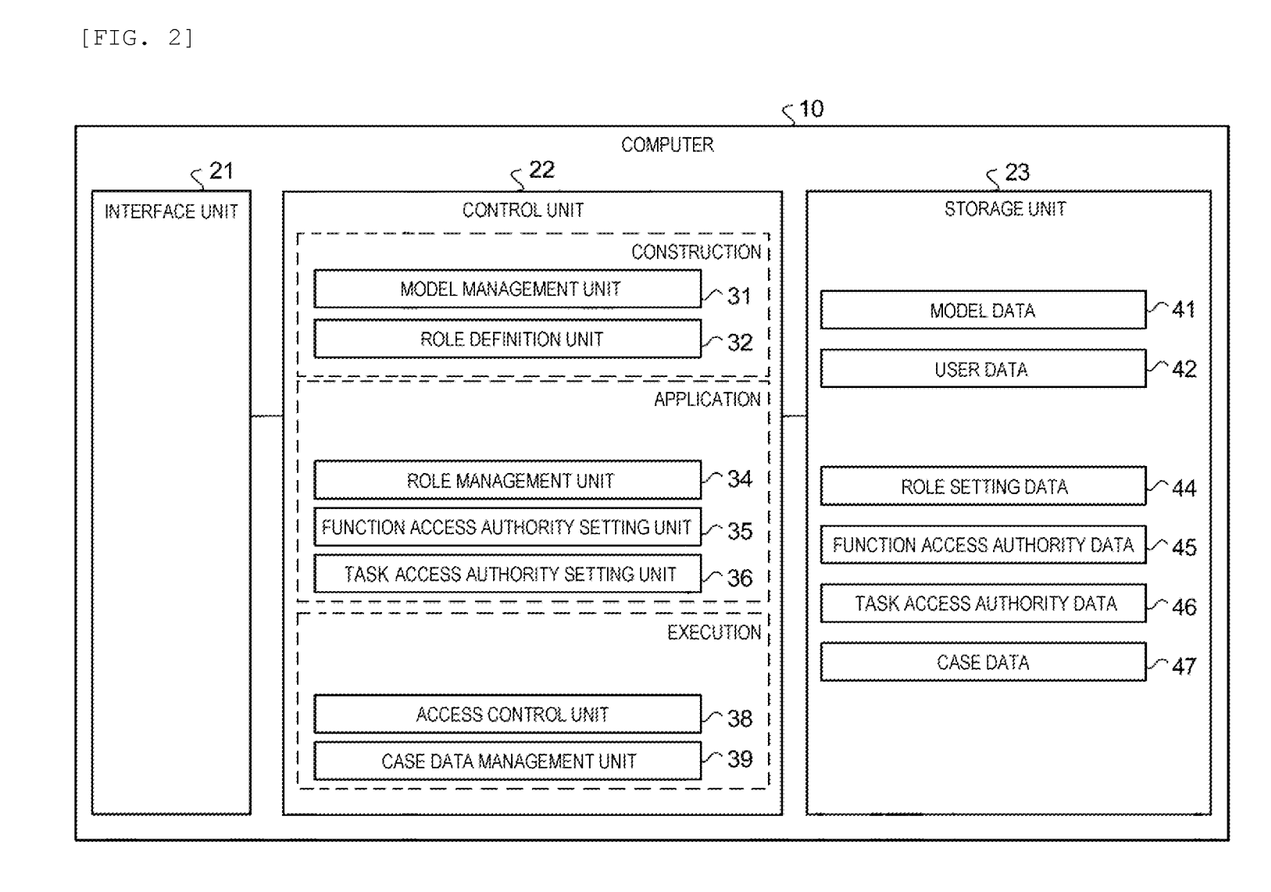
FIG. 2 is a configuration diagram of a computer that implements a system according to the embodiment.

FIG. 2 is a configuration diagram of a computer that implements the system according to the present embodiment. A computer 10 illustrated in FIG. 2 includes an interface unit 21, a control unit 22, and a storage unit 23.

The interface unit 21 receives input from an operator via, for example, a communication network, and provides an operation screen for the operator. Examples of the operator include a constructor who constructs a model of the supply chain, an applier who sets an access restriction, and the like, and an executor who executes the task included in the supply chain.

The interface unit 21 can provide operation screens individually provided for each of the constructor, the applier, and the executor.

The control unit 22 is, for example, a central processing unit (CPU), and implements various functions by loading programs in a memory (not illustrated) and executing the programs. The storage unit 23 is a storage medium such as a magnetic storage device, and is used to store various types of data.

Specifically, the control unit 22 operates as a model management unit 31, a role definition unit 32, a role management unit 34, a function access authority setting unit 35, a task access authority setting unit 36, an access control unit 38, and a case data management unit 39.

The storage unit 23 stores model data 41 indicating the model of the supply chain, user data 42 obtained by registering a user who accesses the system, role setting data 44 obtained by assigning a role to the user, function access authority data 45 obtained by setting a function-specific access authority for the role, task access authority data obtained by setting a task-specific access authority for the role, case data, which is case-specific information on tasks or articles, and the like.

The model management unit 31 and the role definition unit 32 belong to construction.

The model management unit 31 generates the model of the supply chain, and stores the generated model as the model data 41 in the storage unit 23 to manage the model.

The role definition unit 32 defines a role that can be assigned to the user.

The role management unit 34, the function access authority setting unit 35, and the task access authority setting unit 36 belong to application.

The role management unit 34 generates the role setting data 44 by assigning the role to a user such as the executor of each of the tasks, and registers the role setting data 44 in the storage unit 23.

The function access authority setting unit 35 generates the function access authority data 45 by setting the function-specific access authority for the role, and stores the function access authority data 45 in the storage unit 23. Specifically, the API may be prepared for each of the functions, and the role access authority may be set by each API.

The task access authority setting unit 36 generates the task access authority data 46 by setting the task-specific access authority for the role, and stores the task access authority data 46 in the storage unit 23.

The access control unit 38 and the case data management unit 39 belong to execution.

When access is received from the user such as the executor of the task, the access control unit 38 performs access control based on the role assigned to the user.

Specifically, the access control unit 38 receives an operation permitted by both the function access authority data 45 and the task access authority data 46.

The case data management unit 39 manages an execution history of the tasks of the supply chain by registering the execution history in the case data 47.

Figure 3:
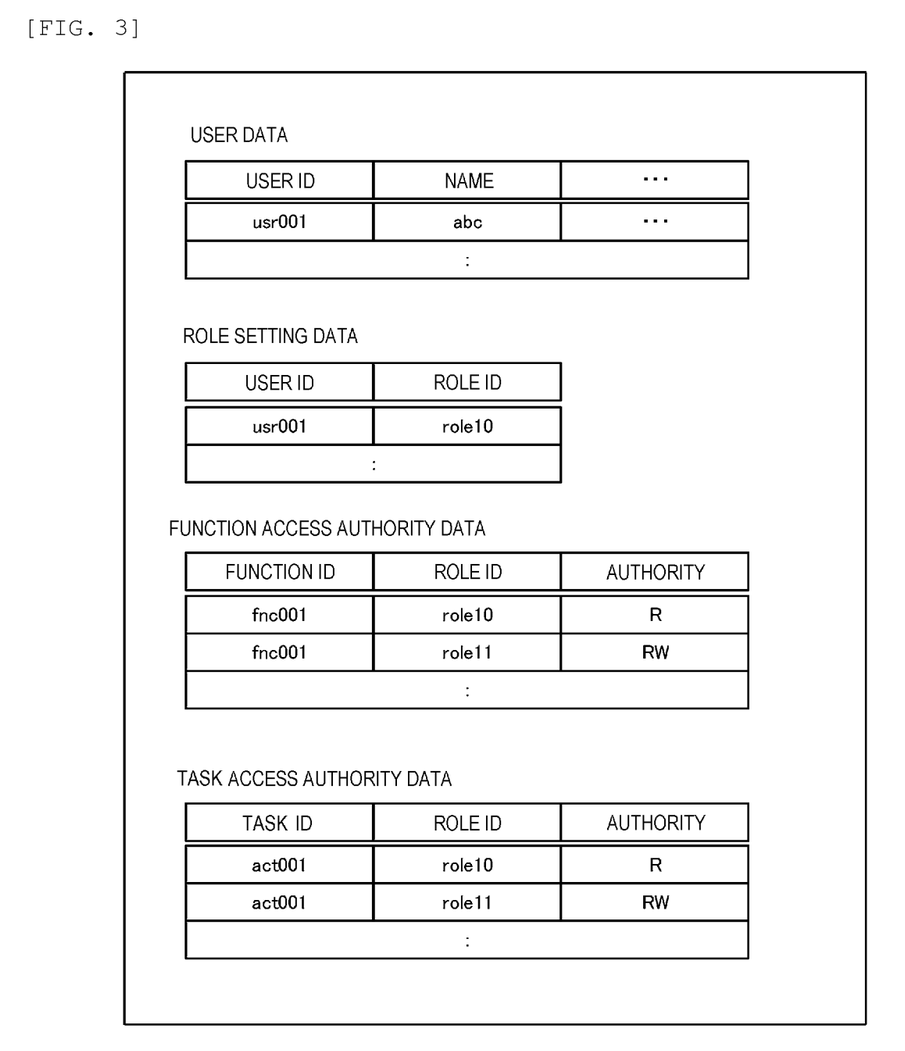
FIG. 3 is an explanatory diagram of a specific example of data.

FIG. 3 is an explanatory diagram of a specific example of data.

In the user data 42 illustrated in FIG. 3, information such as name is associated with a user ID for identifying a user.

In the role setting data 44 illustrated in FIG. 3, a role ID for identifying a role is associated with a user ID.

In the function access authority data 45 illustrated in FIG. 3, a role ID and an authority are associated with a function ID for identifying a function. The authority is designated by permission of read-only (R), permission of read and write (RW), prohibition of both read and write (D), and the like.

In the task access authority data 46 illustrated in FIG. 3, a role ID and an authority are associated with a task ID for identifying a task. The authority is designated by permission of read-only (R), permission of read and write (RW), prohibition of both read and write (D), and the like.

Figure 4:
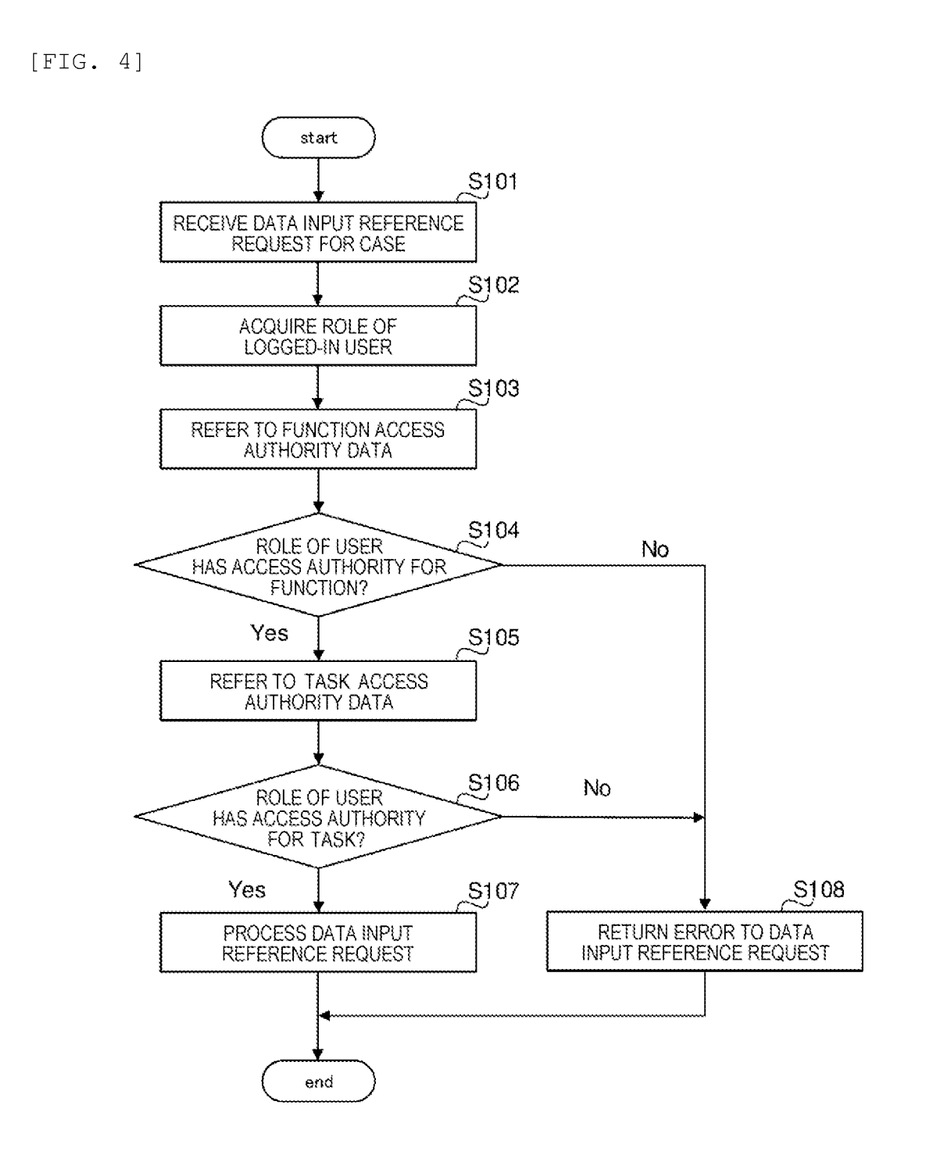
FIG. 4 is a flowchart illustrating a processing procedure related to access control.

FIG. 4 is a flowchart illustrating a processing procedure related to access control by the computer 10. When a data input reference request for a case is received (step S101), the access control unit 38 refers to the role setting data 44 to acquire a role of a logged-in user (step S102).

After step S102, the access control unit 38 refers to the function access authority data 45 (step S103), and determines whether the role of the user has an access authority for the function (step S104).

If the role of the user has the access authority for the function (step S104; Yes), the access control unit 38 refers to the task access authority data 46 (step S105), and determines whether the role of the user has an access authority for the task (step S106).

If the role of the user has the access authority for the task (step S106; Yes), the access control unit 38 permits processing of the request, the case data management unit 39 processes the data input reference request (step S107), and ends the processing procedure of FIG. 4.

When the role of the user does not have the access authority for the function (step S104; No), or when the role of the user does not have the access authority for the task (step S106; No), the access control unit 38 returns an error to the data input reference request and ends the processing procedure of FIG. 4.

Figure 5:
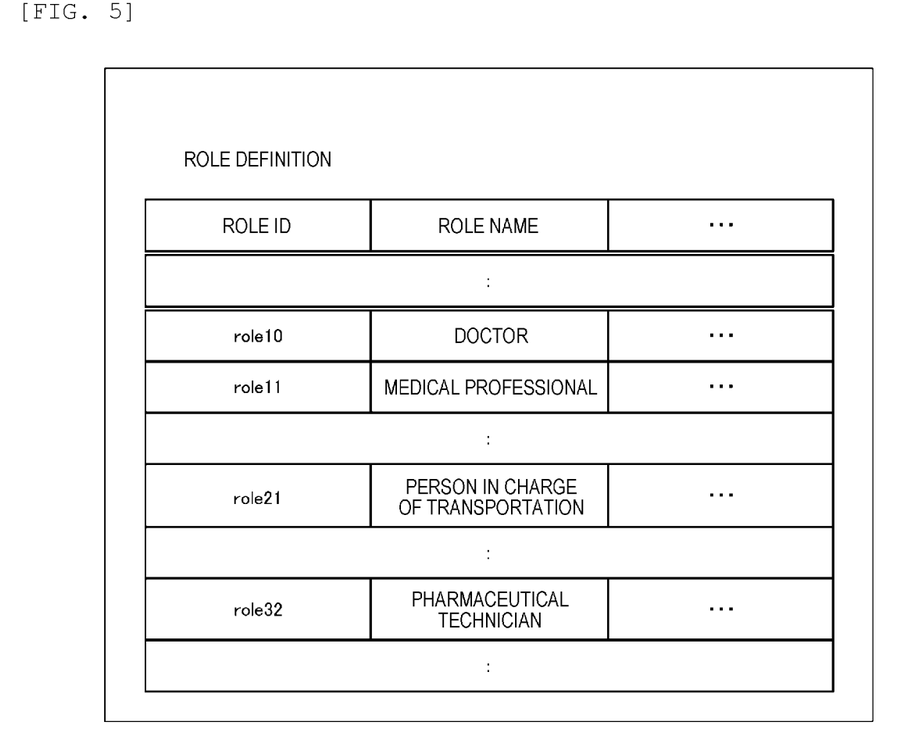
FIG. 5 is a specific example of role definition.

FIG. 5 is a specific example of role definition.

In FIG. 5, items such as a role name are associated with a role ID.

As an example, a role name "doctor" is associated with the role ID "role10", and a role name "medical professional" is associated with a role ID "role11".

Similarly, a role name "person in charge of transportation" is associated with a role ID "role21", and a role name "pharmaceutical technician" is associated with a role ID "role32".

Figure 6:
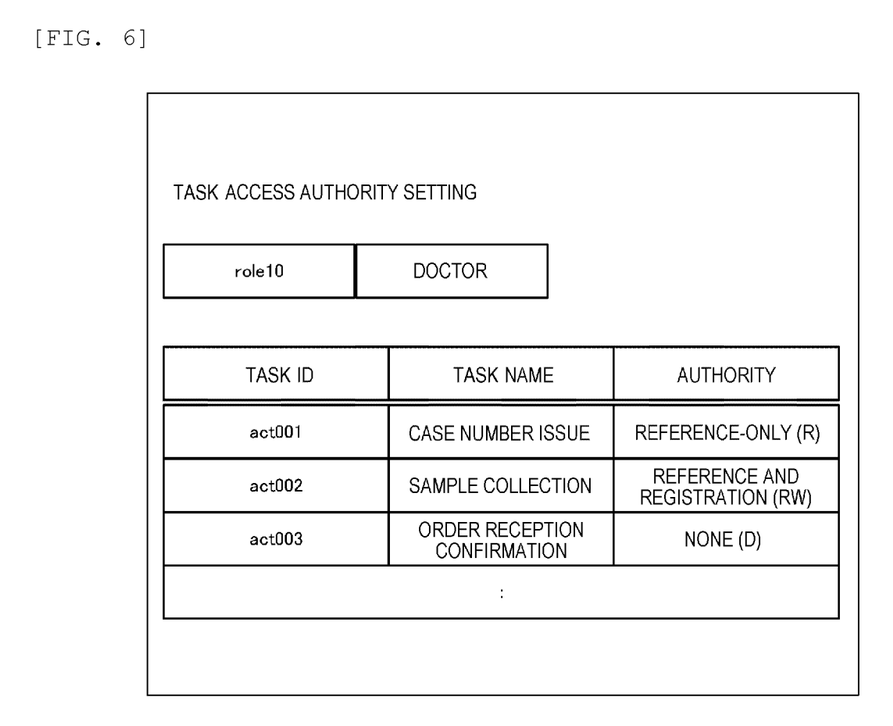
FIG. 6 is an example of a setting screen of a task access authority for a role ID "role10".

FIG. 6 is an example of a setting screen of a task access authority for the role ID "role10".

In the setting screen of FIG. 6, a table for setting the task-specific authority is displayed in addition to a display indicating the setting for the role ID "role10" and the role "doctor".

As an example, in the table, a task name "case number issue" and an authority "reference-only (R)" are associated with a task ID "act001".

In addition, a task name "sample collection" and an authority "reference and registration (RW)" are associated with a task ID "act002".

Similarly, a task name "order reception confirmation" and an authority "none (D)" are associated with a task ID "act003".

Figure 7:
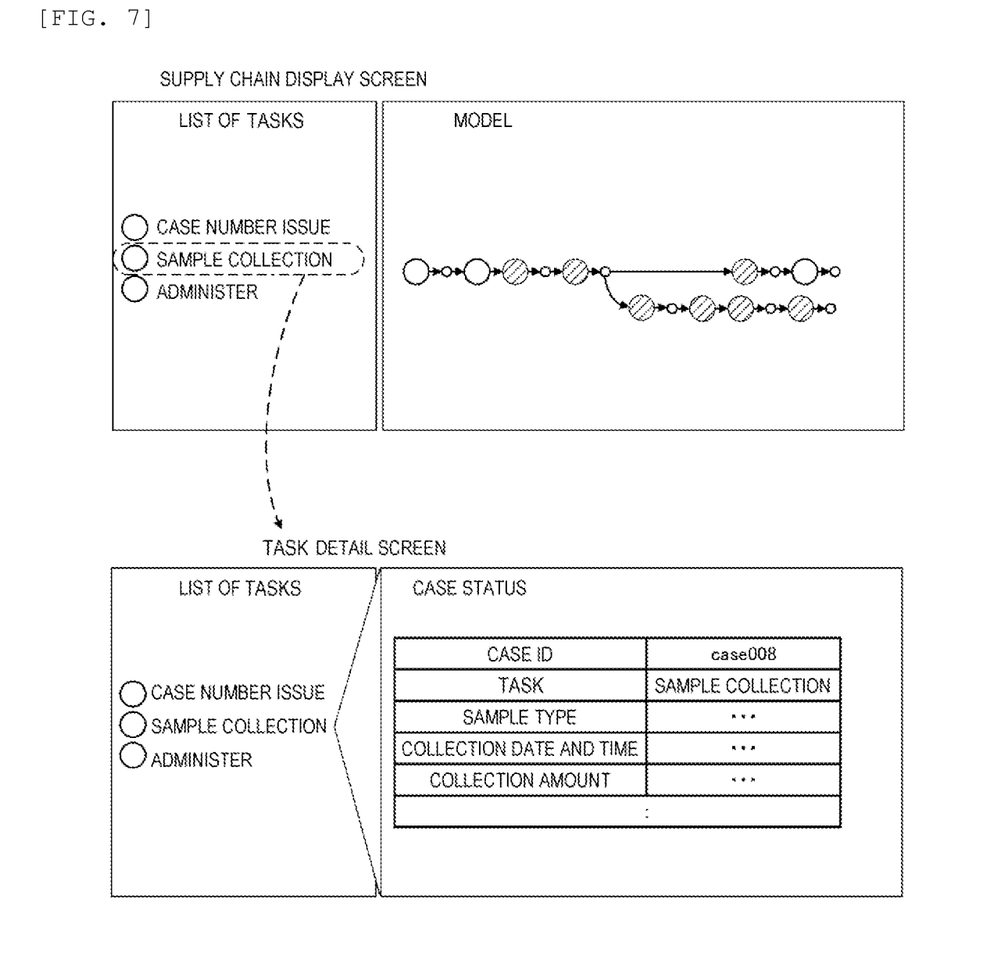
FIG. 7 is an example of a screen displayed to a user with the role ID "role10".

FIG. 7 is an example of a screen displayed to a user with the role ID "role10".

In the supply chain display screen illustrated in FIG. 7, a list of tasks is displayed in a left display area, and a model is displayed in a right display area.

Specifically, the left display area displays a list of tasks for which access of the role ID "role10" is permitted.

In addition, in the right display area, the entire supply chain is displayed in a graph by nodes and links, and whether access is permitted for each node is indicated by a difference in display mode. As the difference in display mode, a difference in color, pattern, shape, size, or the like can be used.

When a node is selected from the list display of the supply chain display screen, transition to a task detail screen is performed on the condition that access is permitted.

A left display area of the task detail screen is the same as that of the supply chain display screen. In a right display area, a task name and case data of the task are displayed.

Figure 8:
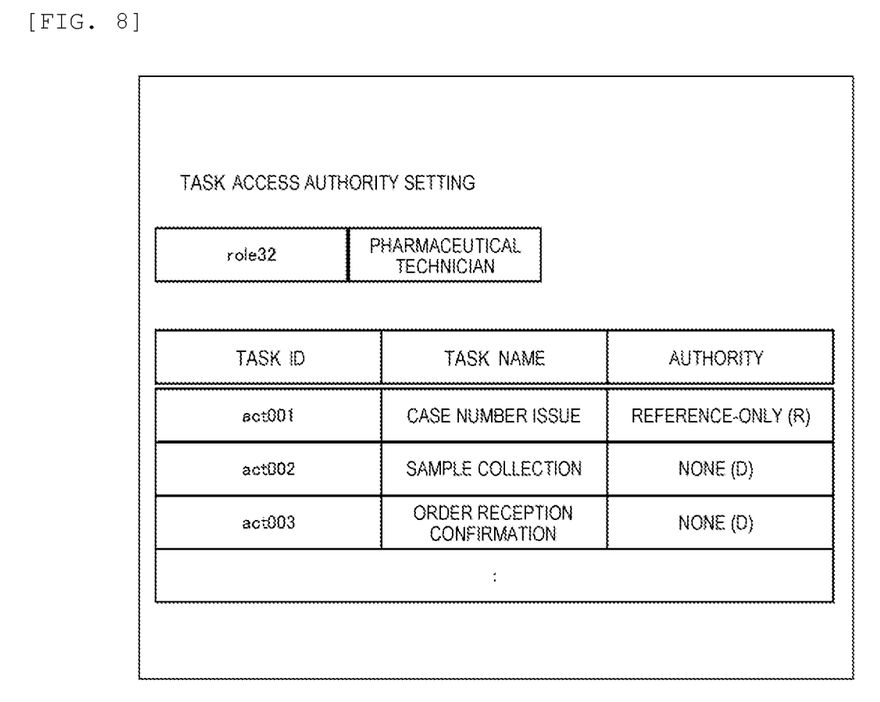
FIG. 8 is an example of a setting screen of a task access authority for a role ID "role32".

FIG. 8 is an example of a setting screen of a task access authority for the role ID "role32".

In the setting screen of FIG. 8, a table for setting the task-specific authority is displayed in addition to a display indicating the setting for the role ID "role32" and the role "pharmaceutical technician".

As an example, in the table, the task name "case number issue" and the authority "reference-only (R)" are associated with the task ID "act001".

In addition, the task name "sample collection" and the authority "none (D)" are associated with the task ID "act002".

Similarly, the task name "order reception confirmation" and the authority "none (D)" are associated with the task ID "act003".

Figure 9:
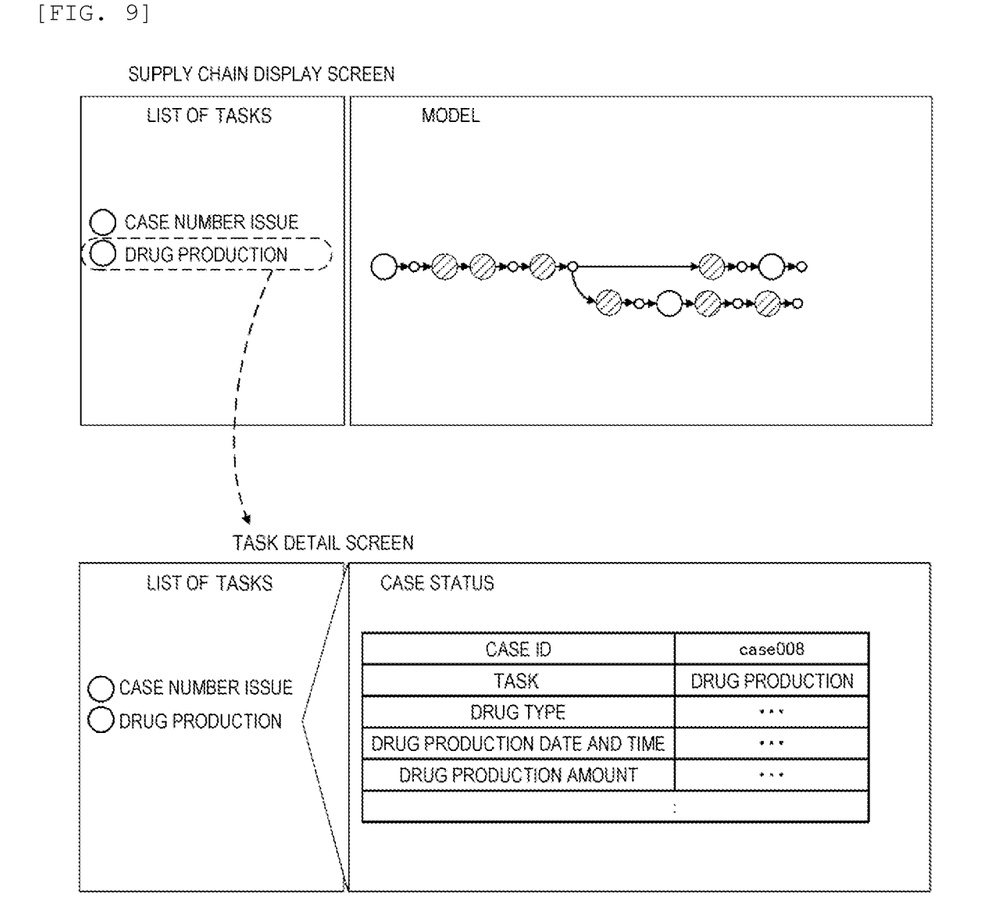
FIG. 9 is an example of a screen displayed to a user with the role ID "role32".

FIG. 9 is an example of a screen displayed to a user with the role ID "role32".

In the supply chain display screen illustrated in FIG. 9, a list of tasks is displayed in a left display area, and a model is displayed in a right display area.

Specifically, the left display area displays a list of tasks for which access of the role ID "role32" is permitted.

In addition, in the right display area, the entire supply chain is displayed in a graph by nodes and links, and whether access is permitted for each node is indicated by a difference in display mode. As the difference in display mode, a difference in color, pattern, shape, size, or the like can be used.

When a node is selected from the list display of the supply chain display screen, transition to a task detail screen is performed on the condition that access is permitted.

A left display area of the task detail screen is the same as that of the supply chain display screen. In a right display area, a task name and case data of the task are displayed.

Figure 10:
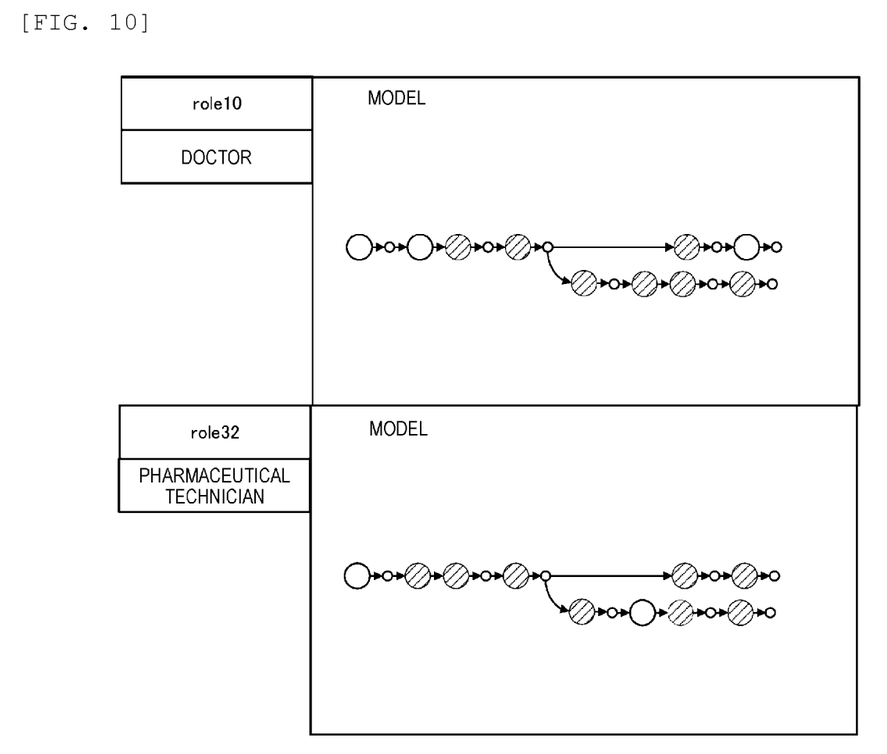
FIG. 10 is an explanatory diagram of a difference in display by the role.

FIG. 10 is an explanatory diagram of a difference in display by the role. In FIG. 10, the graph displays of the role ID "role10" and the role ID "role32" in the supply chain display screen is illustrated in comparison.

As illustrated in FIG. 10, the graph shape of the supply chains is the same, but the display modes of a node indicating presence or absence of the authority are different due to the role difference.

As described above, the computer 10 operating as an access control system according to the embodiment includes: the model management unit 31 configured to manage a chain of supply-related tasks as a model; the role management unit 34 configured to assign a role to an executor of each of the tasks to manage the role; the task access authority setting unit 36 configured to set a task-specific access authority for the role to generate task access authority information; and the access control unit 38 configured to, when access from the executor of the task is received, refer to the task access authority information based on the role assigned to the executor and perform access control.

According to such configurations and operations, the access control system can set different access authorities for each of the tasks even with the same role and the same function, and can implement advanced and detailed access control.

The computer 10 further includes the function access authority setting unit 35 configured to set a function-specific access authority for the role to generate function access authority information. The access control unit 38 is configured to receive an operation permitted in both the task access authority information and the function access authority information.

Therefore, the computer 10 can implement detailed access control by combining the task-specific access authority and the function-specific access authority.

The access control unit 38 is configured to refer to the function access authority information when access from the executor of the task is received, refer to the task access authority information when access is permitted in the function access authority information, and receive an operation in which access is permitted in the task access authority information.

With such operations, the computer 10 can preferentially determine the function-specific access authority, and can perform access control for each of the tasks within a range permitted by the function-specific access authority.

The computer 10 is configured to provide operation screens individually provided for each of a constructor who constructs the model, an applier who performs a setting operation of the access authority, and the executor.

With such an operation, the operator of the computer 10 can use a necessary and sufficient operation screen according to the division, and can improve operability and security.

The computer 10 includes the case data management unit 39 configured to manage an execution history of the supply-related tasks as case data, and thus can perform both management of the model and management of the case data.

In the present embodiment, management of a supply chain of the regenerative medicine products is exemplified, and the model management unit 31 is configured to manage a model for a chain of tasks including a task of collecting a sample from a patient, a task of transporting the sample, a task of producing a drug using the sample, a task of transporting the drug, and a task of administering the drug.

The supply chain of the regenerative medicine products is merely an example, and the invention can be used for any supply chain.

In this way, the configurations and operations illustrated in the embodiment are merely examples, and the invention can be implemented by appropriately changing the configurations and operations.

For example, the computer 10 does not necessarily have to be a device that physically includes a housing, and operations similar to those of the computer 10 may be implemented by combining virtual resources.

REFERENCE SIGNS LIST 10 computer
21 interface unit
22 control unit
23 storage unit
31 model management unit
32 role definition unit
34 role management unit
35 function access authority setting unit
36 task access authority setting unit
38 access control unit
39 case data management unit
41 model data
42 user data
44 role setting data
45 function access authority data
46 task access authority data
47 case data

The invention claimed is:

1. An access control system comprising:
a processor;
a display coupled to the processor;
a memory coupled to the processor, the memory storing instructions that
when executed by the processor, configures the processor to:
manage a chain of tasks as a model;
assign a role to an executor of each of the tasks to manage the role, the role permitting access to one or more of the tasks,
set a function-specific API for each of a plurality of functions, each API being usable by the role according to a function-specific access authority of the role to perform the respective functions of the APIs, the function-specific access authority permitting the function to be performed on more than one task,
set a task-specific access authority for the role to generate task access authority information,
when access from the executor of the task is received via an API, determine whether the role has the function-specific access authority for the function of the API, and upon determining the role has the function-specific access authority for the function of the API, refer to the task access authority information based on the role assigned to the executor and perform access control, and
display, on a screen of the display, one or more tasks for which access of the role is permitted, and display the model including the chain of tasks, each task being indicated by a node having a different visual characteristic indicating whether the role has access to the task indicated by the node, each node being connected by a link.

2. The access control system according to claim 1,
wherein the processor is configured to:
generate function access authority information based on the function-specific access authority and the role, and
receive an operation permitted in both the task access authority information and the function access authority information.

3. The access control system according to claim 2,
wherein the processor is configured to refer to the function access authority information when access from the executor of the task is received, refer to the task access authority information when access is permitted in the function access authority information, and receive an operation in which access is permitted in the task access authority information.

4. The access control system according to claim 1,
wherein the processor is configured to display, on the display, operation screens individually provided for each of a constructor who constructs the model, an applier who performs a setting operation of the access authority, and the executor.

5. The access control system according to claim 1,
wherein the processor is configured to manage an execution history of the supply-related tasks as case data.

6. The access control system according to claim 1,
wherein the processor is configured to manage a model for a chain of tasks including a task of collecting a sample from a patient, a task of transporting the sample, a task of producing a drug using the sample, a task of transporting the drug, and a task of administering the drug.

7. An access control method, executed by a computer, the method comprising:
managing a chain of tasks as a model;
assigning a role to an executor of each of the tasks to manage the role, the role permitting access to one or more of the tasks;
setting a function-specific API for each of a plurality of functions, each API being usable by the role according to a function-specific access authority of the role to perform the respective functions of the APIs;
a task access authority setting step of setting a task-specific access authority for the role to generate task access authority information;
an access control step of, when access from the executor of the task is received via an API, determining whether the role has the function-specific access authority for the function of the API, and upon determining the role has the function-specific access authority for the function of the API, referring to the task access authority information based on the role assigned to the executor and performing access control; and
displaying, on a screen of a display, one or more tasks for which access of the role is permitted, and display the model including the chain of tasks, each task being indicated by a node having a different visual characteristic indicating whether the role has access to the task indicated by the node, each node being connected by a link.

8. A non-transitory computer readable medium storing an access control program causing a computer to execute steps comprising:
managing a chain of supply-related tasks as a model;
a role management step of assigning a role to an executor of each of the tasks to manage the role, the role permitting access to one or more of the tasks and setting a function-specific API for each of a plurality of functions, each API being usable by the role according to a function-specific access authority of the role to perform the respective functions of the APIs;

a task access authority setting step of setting a task-specific access authority for the role to generate task access authority information;

an access control step of, when access from the executor of the task is received via API, determine whether the role has the function-specific access authority for the function of the API, and upon determining the role has the function-specific access authority for the function of the API, referring to the task access authority information based on the role assigned to the executor and performing access control; and displaying, on a screen of a display, one or more tasks for which access of the role is permitted, and display the model including the chain of tasks, each task being indicated by a node having a different visual characteristic indicating whether the role has access to the task indicated by the node, each node being connected by a link.

* * * * *